Feb. 10, 1931.    L. A. CUMMINGS    1,791,957
GRASS CUTTING TOOL
Filed Nov. 18, 1929
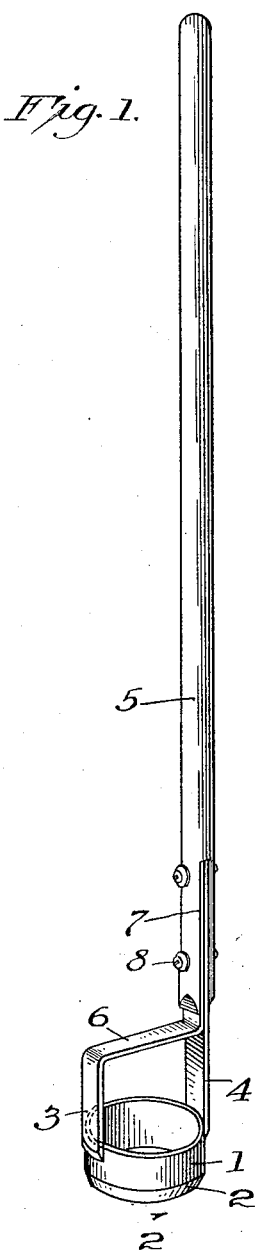
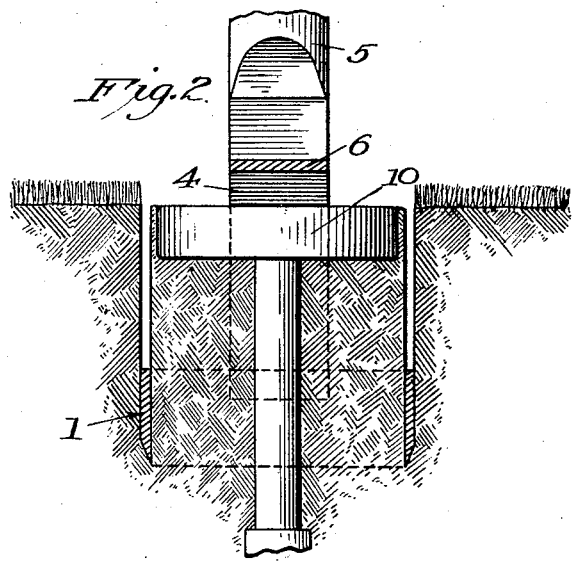
INVENTOR.
Lloyd A. Cummings.
BY Arthur P. Knight &
Alfred W. Knight
ATTORNEYS.

Patented Feb. 10, 1931

1,791,957

UNITED STATES PATENT OFFICE

LLOYD A. CUMMINGS, OF GLENDALE, CALIFORNIA

GRASS-CUTTING TOOL

Application filed November 18, 1929. Serial No. 408,088.

This invention relates to a grass cutting tool and particularly to a tool adapted to cut grass or sod around lawn sprinkler heads, and the main object of the invention is to provide a tool for this purpose which will be convenient and effective in use, and of simple and strong construction.

The accompanying drawings illustrate embodiments of my invention and referring thereto:

Fig. 1 is a perspective view of the preferred form of my invention.

Fig. 2 is a vertical section of the lower portion of the tool in the position it assumes when in use.

The tool shown in Fig. 1 comprises a cylindrical cutting ring 1 preferably having a beveled cutting edge 2 at its lower end, shank members 3 and 4 formed on or secured to the cutting ring 1 and extending upwardly therefrom parallel to the axis of the cylindrical cutting ring, and a handle 5 connected to said shanks members. In this form of my invention, shank member 3 is provided at its upper end with a horizontal extension 6 which extends over the cutting ring 1 at a certain distance above the same and has an upward projection 7 extending alongside the shank member 4 and secured thereto by bolts or rivets 8 which also secure both of said shank members to the handle 5.

The handle 5 is here shown as consisting of a bar or rod extending upwardly from the shank members 7 to a sufficient height to enable it to be conveniently grasped and operated by the operator's hands without stooping, the handle 5 extending parallel to the axis of the cylindrical cutting ring and the construction being such that when the device is placed on the ground in position for operation the shanks 3 and 4 and the handle 5 extend vertically. The handle 5 may be formed of wood, the cutting ring 1 being preferably formed of steel so as to provide a cutting edge of the necessary hardness, and the shank members 3 and 4 being formed of any suitable metal such as iron, and being secured to ring 1 by welding or otherwise.

In using the device, the cutting ring 1 is placed around the sprinkler head 10 and is forced downwardly into the sod by pressure of the foot on the horizontal shank extension 6 so as to cause the cutting edge of the ring 1 to cut the sod around the sprinkler head, the device being forced down in this manner until said shank member is near the top of the sprinkler head as shown in Fig. 2. This operation may be facilitated by tilting the device from side to side, and rotating it if desired while in operation so as to more effectively cut the grass and sod around the sprinkler head. By reason of the fact that the shanks 3 and 4 extend vertically for a considerable distance above the cylindrical cutting ring as shown, the device may be forced into the ground with a minimum of resistance and the shanks are kept clear of the sprinkler head in such operation, enabling the cutting ring to penetrate the soil to the requisite depth without obstruction due to the shanks striking the sprinkler head.

It will be understood that there is a tendency of the grass around the sprinkler head to grow over the top of the sprinkler head, and when the tool is forced down in the manner above described, such grass growing over the sprinkler head is cut off. On then withdrawing the device, the grass so cut off is pulled away from the sprinkler head and a clear space is left around the sprinkler head which will serve to prevent encroachment of the grass on or over the sprinkler head for a considerable time.

The construction shown in the drawings is of advantage in that shank extension 6 extends horizontally the full width of the cutting ring and gives an effective foot rest whereby the operator can conveniently exert direct downward pressure on the device.

I claim:

1. A grass cutting tool comprising a cylindrical cutting ring, shank members extending upwardly from said cylindrical cutting ring parallel to the axis thereof, a horizontal member extending between the upper ends of said shank members and extending over the full width of the cutting ring, and a handle member extending upwardly from one of said shank members.

2. A grass cutting tool comprising a cylindrical cutting ring, shank members extending vertically upward from said cutting ring, one of said upwardly extending members being formed with a horizontal extension extending over the full width of the cutting ring and connected at its further end to the other of said upwardly extending members, and a handle secured to the upper ends of said shank members and extending upwardly therefrom.

In testimony whereof I have hereunto subscribed my name this 9th day of November, 1929.

LLOYD A. CUMMINGS.